March 25, 1952 F. J. HOLBIK 2,590,620
SAFETY AND RELEASE VALVE FOR PRESSURE COOKERS
Filed Jan. 30, 1948
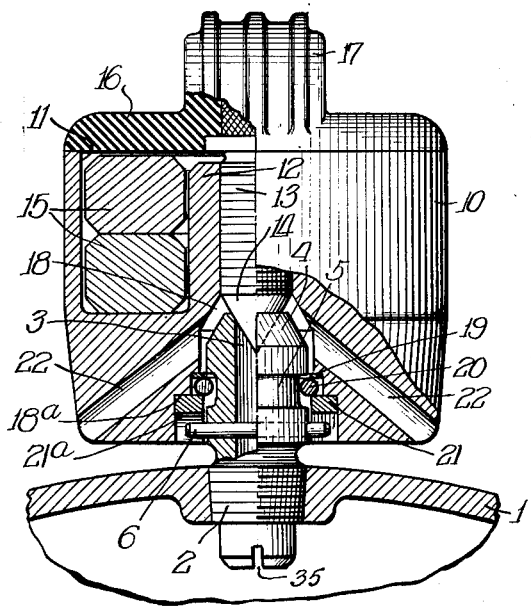
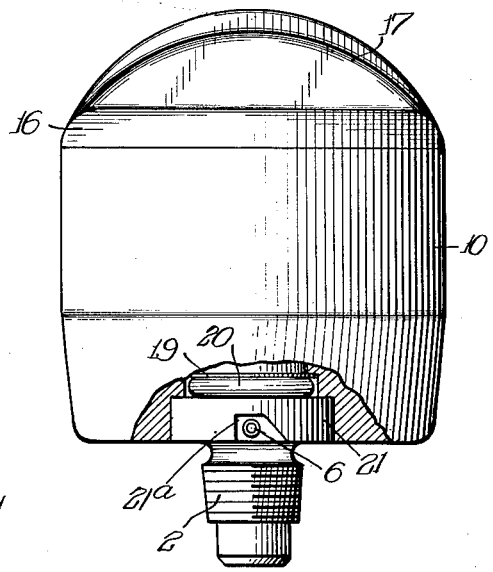
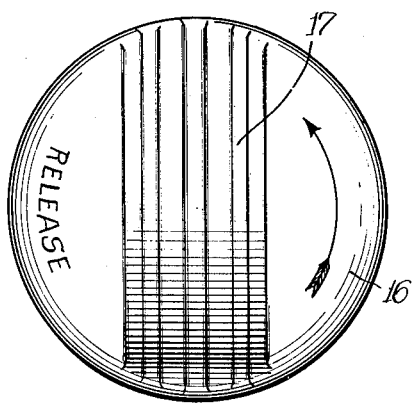
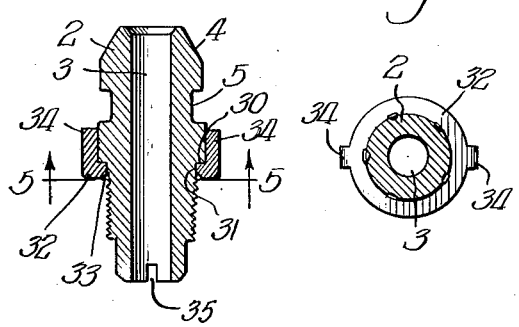
INVENTOR.
Frank J. Holbik,
BY George H. Simmons
atty.

Patented Mar. 25, 1952

2,590,620

UNITED STATES PATENT OFFICE 2,590,620

SAFETY AND RELEASE VALVE FOR PRESSURE COOKERS

Frank J. Holbik, Racine, Wis., assignor to Speed-Meal Corporation, Racine, Wis., a corporation of Delaware Application January 30, 1948, Serial No. 5,472

6 Claims. (Cl. 137—53)

This invention relates to a combined safety and manual release valve for pressure cookers and has for its principal object the provision of a new and improved valve of this kind.

It is a main object of this invention to provide a safety-release valve for pressure cookers that is securely fixed on the cooker and yet is free to move with respect thereto, as required in the operation of the valve.

Another object of the invention is to provide a combined safety and manually-operated release valve that is really safe even in the hands of an inexperienced operator.

Another object of the invention is to provide a manually-operated valve incorporated in a pressure-operated safety valve and in which the operation of the safety valve is automatically checked at the end of each manual operation.

Another object of the invention is to provide a safety valve which is of pleasing appearance and which can be manufactured at low cost without sacrificing quality.

Further objects of the invention not specifically mentioned here will be apparent from the detailed description and claims which follow, reference being had to the accompanying drawings in which a preferred embodiment of the invention is shown by way of example and in which Fig. 1 is an elevational view partly in section showing the improved valve;

Fig. 2 is a top side plan view of the valve;

Fig. 3 is a side elevational view of the valve with parts broken away to show its construction;

Fig. 4 is an elevational view in section showing a modified form of valve stem; and Fig. 5 is a cross sectional view taken substantially along the line 5—5 of Fig. 4, looking in the direction of the arrows.

Domestic type pressure cookers, which usually consist of a vessel having a handle and closed by a cover likewise having a handle, are sealed by suitable gasket means carried by the cover and engaging the vessel. To guard against the building up of an excessive pressure in a cooker of this type, a safety valve is usually provided and located at the center of the cover. It is to a valve of this type that the present invention particularly relates.

In certain prior art cookers of which I am aware, after the cooking operation has been completed, it is necessary to remove the cooker and contents from the stove and hold the same under a cold water faucet to reduce the pressure therein so that the cover may be removed. In other instances there is incorporated in the safety valve a manual valve which may be opened to permit gradual escape of the pressure so as to reduce the pressure in the cooker down to practically zero so that the cover may be safely removed. It is to the improvement of a combination safety-release valve of this type that the present invention particularly relates.

When the cover is removed from a pressure cooker at the end of a cooking operation, steam will condense on it and it is natural for the housewife to turn the cover upside down so as to hold this condensate in the cover. In certain prior art pressure cookers, the safety valve is not secured to the cover and consequently when the cover is overturned the valve falls off and is quickly damaged or lost. The present invention further provides for securely attaching the safety valve to the cover so that it will not fall off when the cover is turned upside down.

Housewives, housekeepers and the like, are not skilled mechanics, and while many of the prior art safety valves are perfectly safe when properly operated, these operators have succeeded in manipulating these valves so ineffectively as to cause them to jam or otherwise fail to operate as intended. The present invention seeks to remedy this fault by providing a combination safety and manually operated valve in which the operation of the safety valve is automatically checked at the end of each manual operation.

In the operation of a cooker equipped with a valve of this type, at the end of a cooking operation the manual valve is operated to permit escape of the pressure slowly at first, and the valve further operated to permit complete release of pressure so that the cover may be removed with absolute safety. In the ordinary operation of the device, the valve is left in this open position and when the cooker is next used, as the water in it starts to boil air is blown out of the valve, and when all of the air is thus expelled and steam starts emerging from the valve the manual valve is closed to seal the cooker pressure-tight.

In closing the manual valve, the weighted cap is elevated and supported by the valve element which it contains and it is not necessary that this valve element be screwed down tight onto the cap; however, most operators will screw it down farther than necessary. This act has resulted in the jamming of certain valves of the prior art of which I am aware; and in the present valve, if the operator screws the valve down too far, the housing and valve are automatically elevated to open the valve and permit excess steam to escape. If the valve should be jammed by this operation, it will be jammed in open position and building-up of dangerous pressure in the cooker is thus definitely avoided. Ordinarily, as soon as the housewife hears steam emerging from the valve, she will let loose of it and the valve will return to normal position and function properly as a safety valve.

Referring now to the drawings in more detail. In Fig. 1, 1 represents the central section of the cover of a pressure cooker and into which a valve stem 2 is threaded. The valve stem 2, which is generally cylindrical in shape, projects upwardly from the upper surface of the cover 1 and contains a central opening 3 extending from end to end of the stem and around the upper end of which a valve seat is located. The outer surface of the stem has a tapered end portion 4 and a groove 5 for a purpose which will hereinafter appear. Projecting through the stem at a point below the groove 5 is a pin 6.

Fitted over the stem is a cuplike member or housing 10 having an annular cavity 11 opening into its upper edge. Centrally located in this cavity is a boss 12 through which is threaded a screw 13, the lower end of which carries a generally conical valve member 14 which projects into the stem and engages the valve seat therein to seal the pressure cooker.

Located within the cavity in the housing 10 are weights 15 which are held in place therein by the circular base portion 16 of the knob 17 that is carried upon the upper end of the screw 13.

The lower end of the housing contains a counterbore 18 that contains a shoulder 18a against which is disposed a thrust washer 19 that forms a sealing surface for the spring 20. The spring 20 is a ring spring whose inner diameter is less than the outer diameter of the shoulder above the groove 5 and slightly greater than the root diameter of that groove. The spring is held in the counterbore 18 by an annulus 21 pressed therein.

As will be seen best in Fig. 3, the annulus 21 contains diametrically opposed grooves 21a into which the ends of the pin 6 project. As seen in Fig. 3, the left-hand edge of the groove is disposed vertically and at right angles to the face of the annulus, and the right-hand edge of the groove is inclined with respect to both the vertical and the face of the annulus. Preferably the angle of inclination of this surface with respect to the face of the annulus is 45°, although a smaller angle may be used.

In the operation of the pressure cooker, after the cover has been placed on the vessel, knob 17 is turned to unscrew the screw 13, thereby drawing the valve member 14 back into the boss 12 in the housing. This lowers the housing with respect to the valve stem 2, the pin 6 engaging the bottom of the grooves 21a to support the housing on the valve stem with the valve open. Heat is applied to the cooker and as the water therein starts to boil air is driven from the cooker and steam starts to escape through the valve. The housing 10 is provided with a plurality of downwardly extending ports 22 leading from the upper end of the counterbore and through which steam escaping through the valve stem 2 can escape from the housing 10. These ports are positioned so that this steam is directed down onto the top of the cover.

As soon as steam flows freely from the cooker, knob 17 is operated to rotate the screw in a clockwise direction (Fig. 2), thereby moving the valve element 14 downwardly into engagement with the valve seat in the stem. Further movement of the screw in this direction raises the housing 10 and with it the weights 15 so that all are supported on the stem of the valve member 14.

As soon as the screw has been operated far enough to support the valve assembly on the member 14, and not on the pin 6, the safety valve is in operation; however, most probably the housewife will continue to operate the screw until the disc-like portion 16 of the knob firmly engages the top of the housing 10. Such continued movement will eventually place on the housing a torque greater than the weight of the valve assembly, with the result that the pin 6 will ride over the inclined surface of the groove 21a and raise the housing so as to open the valve. Groove 5 is sufficiently wide so that this limited movement of the assembly takes place before the spring 20 engages the upper edge of the groove. Should the parts become worn, or for any other reason the spring should engage this edge of the groove and become jammed thereagainst, the safety valve will not return to normal and the cooker will not be sealed so that pressure cannot be built up in it.

After the pressure within the cooker has been built up to the desired value, which in the example shown and with both weights 15 in place in the housing will be fifteen pounds per square inch, the weight of the valve assembly is insufficient to hold the valve member 14 on the seat against the pressure working on the under surface of this member 14, with the result that the valve will be opened and excess steam allowed to escape. As soon as this escape of steam occurs, the operator knows that the cooker is up to pressure and the heat is then reduced to just maintain that pressure during the cooking period.

As soon as the cooking period has elapsed and it is desired to open the cooker, it is removed from the heat or the heat extinguished, and knob 17 operated in a counter-clockwise direction (Fig. 2) to back the screw 13 upwardly into the housing thereby opening the valve by backing the member 14 away from the valve seat. A slight opening of the valve permits escape of the steam, and after the pressure has died down somewhat the valve may be further opened and the steam allowed to escape more rapidly until the pressure in the vessel is reduced to zero or practically zero, at which time the cover may be removed with safety.

When the cover is removed, steam will be condensed on the under surface of it, and in order to retain the drops of water thus formed in the cover it is natural for the housewife to turn the cover upside down. Spring 20 engaging the upper surface of the groove 5 retains the valve assembly on the stem, the tension of the spring being sufficiently great that even though the cover be handled rather roughly the valve assembly will not fall off of the stem; however, should it be necessary to remove the assembly from the cooker for cleaning or any other purpose, a slight pull on the housing 10 will disengage the same from the stem. The inclined upper surface 4 of the stem facilitates replacement of the valve assembly thereon as desired.

In Figs. 1, 2, and 3, rotation of the valve assembly with respect to the stem is prevented by the pin which projects through the stem and across the central opening therein. In certain instances, the presence of this pin in the port may be objectionable, and in those cases the valve stems shown in Figs. 4 and 5 may be employed. This stem is the same as stem 2, having the inclined upper surface 4 and the groove 5, and having also an annular shoulder 30 and a cylindrical shoulder 31 against which a washer-like annulus 32 is fitted and held in any preferred manner such as by stakes 33. Projecting upwardly from the outer edge of the annulus 32 are ears 34 which lay along the outer surface of the stem and fit into the groove 21a in the housing, in lieu of the projecting ends of the pins 6. The central port 3 in the stem is free and clear of obstructions of any kind, and the operation of the valve assembly is the same as hereinbefore described.

In the cooking of certain materials, apples for example, when the saftey valve operates and reduces the pressure in the cooker, the apples will more or less explode and oftentimes a piece of skin will be blown up against the bottom of the valve stem 2. To prevent the blocking of this stem under such circumstances, the lower end is provided with side opening ports 35 through which the pressure can escape even though a piece of material lays across and completely blocks the bottom opening therein.

The saftey-release valve of my invention is possessed of many advantages. It may be manufactured economically without sacrificing quality. It is securely held on the valve stem so as to minimize damage due to the valve falling off of the cover. Each time the valve is operated manually, the automatic operation is checked so as to insure that the safety valve is in proper working order at all times while pressure is being built up in the cooker. Maximum pressure could be varied by taking out one or both of the weights so that pressures of five, ten, or fifteen pounds can be realized.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a prefered embodiment of my invention, what I consider new and desire to have protected by Letters Patent is pointed out in the appended claims.

What is claimed is:

1. In a safety valve for pressure cookers, a generally cylindrical body having a concentrically located threaded opening; a screw threaded through said opening; a knob fixed on the upper end of said screw and disposed above said body; a valve element formed on the lower end of said screw; a counterbore in the bottom of said body located concentrically of said threaded opening; a generally cylindrical valve stem projecting into said counterbore and having a concentrically located cylindrical opening; a valve seat on the upper end of said valve stem around said opening, said valve element engaging said valve seat to support said body, screw and knob on said stem and to seal said valve stem opening against predetermined pressure, there being grooves in the bottom of said body extending radially outwardly from said counterbore; means on said valve stem projecting into said grooves; and a radial wall at one end of each groove moved into engagement with said means by a counterclockwise rotation of said knob, screw and body to stop the rotation of the body so that further rotation of the screw will lower the body onto said means and then raise said valve element off of said valve seat to vent said valve stem opening.

2. In a safety valve for pressure cookers, a generally cylindrical cuplike member having a cavity opening into its upper end, a cylindrical boss concentrically located in said cavity, annular weights disposed in said cavity and surrounding said boss, a screw threaded through said boss, a knob on said screw extending across the open end of said cavity to hold said weights therein, a counterbore located concentrically in the bottom of said cuplike member into which said screw projects, a shoulder in said counterbore, a spring disposed in juxtaposition to said shoulder, an annulus pressed into said counterbore and against said spring to hold the spring in the counterbore, a generally cylindrical valve stem having a concentric central opening, a valve seat surrounding said opening at the upper end of said stem, a valve head on said screw engaging said seat to seal the stem against a predetermined pressure, said valve stem projecting into the counterbore and having a groove into which the spring extends to hold the cuplike member on the stem, said groove being wider than the spring is thick to permit limited movement of the member axially along the stem, said annulus having radially disposed grooves in its lower surface, and means carried by the stem and projecting into said grooves to prevent rotation of the cuplike member around the stem.

3. In a safety valve for pressure cookers, a generally cylindrical body having a concentrically located threaded opening; a screw threaded in said opening; a knob fixed on the upper end of said screw and disposed above said body; a valve element formed on the lower end of said screw; a counterbore in the bottom of said body located concentrically of said threaded opening; a generally cylindrical valve stem projecting into said counterbore and having a concentrically located cylindrical opening; a valve seat on the upper end of said valve stem around said opening, said body having grooves in its bottom surface extending radially outwardly from said counterbore; means on said valve stem projecting into said grooves and engaging the tops thereof to support the body, screw and knob on the stem, said screw advancing through said threaded opening as the knob is turned clockwise to engage said valve element with said valve seat and then to raise said body off of said means thereby to seal said valve stem opening against predetermined pressure; and an inclined wall at one end of each groove rotated into engagement with said means and riding over the same to raise the body screw and valve element thereby to break said seal when said clockwise rotation of the knob is continued after the seal is formed.

4. A safety-release valve as set out in claim 3, in which the means carried by the valve stem consists of a pin extending through the valve stem and projecting radially therefrom into said grooves.

5. A safety-release valve as set out in claim 3, in which the means carried by the valve stem consists of a collar encircling the stem and fixed thereto and having earlike projections extending radially outwardly into said grooves.

6. A safety-release valve as set out in claim 3, in which the slope of the inclined surfaces bounding the groove in the cap forms an angle of approximately 45° so that torque placed on the screw and cap will have a substantial component along the axis of the valve stem and cap.

FRANK J. HOLBIK.

REFERENCES CITED

The following references are of record in the file of this patent:

UNITED STATES PATENTS

| Number | Name | Date |
|---|---|---|
| 858,131 | Aichele | June 25, 1907 |
| 1,834,837 | Hashimoto | Dec. 1, 1931 |
| 2,308,320 | Stephens | Jan. 12, 1943 |

FOREIGN PATENTS

| Number | Country | Date |
|---|---|---|
| 4,081 | Great Britain | Sept. 22, 1881 |
| 230,049 | Switzerland | Dec. 15, 1943 |